L. JANOT.
CINEMATOGRAPHIC APPARATUS.
APPLICATION FILED JULY 23, 1917.
1,317,502.
Patented Sept. 30, 1919.
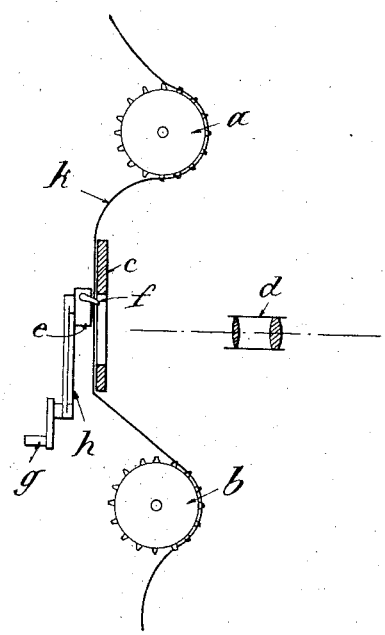
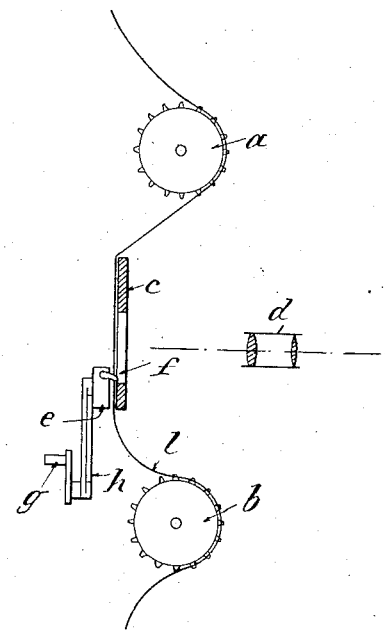
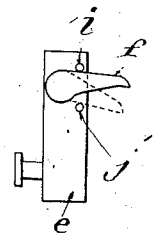
Inventor
Louis Janot
by [signature]
his Attorney

UNITED STATES PATENT OFFICE.

LOUIS JANOT, OF VINCENNES, FRANCE, ASSIGNOR TO COMPAGNIE GENERALE DES ETABLISSEMENTS PATHE FRERES, PHONOGRAPHE ET CINEMATOGRAPHE, OF PARIS, FRANCE.

CINEMATOGRAPHIC APPARATUS.

1,317,502. Specification of Letters Patent. Patented Sept. 30, 1919.

Application filed July 23, 1917. Serial No. 182,322.

*To all whom it may concern:*

Be it known that I, LOUIS JANOT, citizen of the Republic of France, residing at 30 Rue des Vignerons, Vincennes, Seine, in the Republic of France, have invented new and useful Improvements in Cinematographic Apparatus, of which the following is a specification.

This invention relates to improvements in apparatus for taking cinematographic pictures.

With cinematograph apparatus actually in use it is practically impossible to take a sufficiently great number of views per second, the inertia of the film preventing the starting and stopping of the film being instantaneously effected. If for instance one tries to take 150 views per second, the mean speed of the film will be 3 meters per second, that of the conveying hooks will be 6 meters and as the release is effected by these hooks the perforations of the film would be torn at starting. There is also the possibility that at stopping too much pressure of the stretcher would produce rubbing and streakiness of the film.

The invention has for its object an improved cinematograph apparatus allowing of taking a relatively high number of pictures per second, for instance 150, without inconvenience.

The feeding device for the film in the improved apparatus is of the type in which the film is unwound from a paying out roll and wound up around a receiving roll, both rolls rotating in a continuous manner, the film being advanced across the gate of the apparatus by means of feeding teeth having a substantially vertical to and fro movement and being controlled by means of a link and crank arrangement, said teeth descending to advance the film by a length corresponding to an image and having then an idle upward stroke preparatory to the succeeding downward feeding movement. The period in which the teeth descend may be substantially equal to that in which the teeth rise so that the average linear speed of the film i. e. the speed which is imparted to it by the feeding rolls or drums is substantially one half of the linear speed which is intermittently imparted to the film by the feeding teeth in a downward direction.

According to the invention the film is so threaded in the apparatus that there is no slack in the film between the gate and the receiving roll when the feeding teeth are at the top of their stroke and about to begin their downward feeding movement. It results therefrom that the film is started downwardly not only by the feeding teeth but also by the receiving roll. By this means, the tractional strain from the teeth on the film is reduced and the teeth may be operated at a high speed without any risk of tearing the film.

Moreover, according to the invention the film is so threaded on the apparatus that there is no slack in the said film between the gate and the paying out roll when the feeding teeth have completed their downward feeding stroke so that when the teeth reach the bottom end of their stroke the film is prevented from continuing to descend by inertia owing to the fact that it is then held up not only by the teeth but also by the paying out roll, which arrangement permits of avoiding the use of spring controlled friction shoes for stopping the film whereby high speed working is permitted.

In the above mentioned case, when the linear speed of the feeding teeth is double the average speed of the film, the above result is obtained by mounting the film in the apparatus in such a way that the length of film extending from the paying out roll to the receiving roll is exactly equal to the shortest path offered to the film between said rolls through the gate augmented by half the height of an image. More generally speaking the said length of film should be equal to the shortest path offered to the film between said rolls through the gate augmented by a length equal to the portion of the height of the image which is delivered or taken up by the rolls between the end of a feeding stroke of the teeth and the beginning of the next feeding stroke thereof.

According to a further feature of the invention, a feeding carriage is preferably used which is moved vertically along a straight line by a link and crank arrangement and in which the feeding teeth are so mounted that they can swing freely between two stops.

In the annexed drawing a form of construction of the apparatus is diagrammatically illustrated.

Figure 1 is a view in elevation of the apparatus the hook carrying carriage being at the top of its stroke.

Fig. 2 shows the same apparatus the carriage being at the bottom of its course.

Fig. 3 is a detail view of the hook carrying carriage.

It can be seen from the drawing that the apparatus comprises essentially two toothed feeders $a$ and $b$, a stretcher frame $c$ as reduced as possible arranged between the two feeders and behind the objective $d$ and a movable carriage $e$ carrying the hooks $f$ and to which is given a reciprocating movement by a handle $g$ and a rod $h$. The hooks can oscillate freely within a sector limited by two stops $i$ and $j$ fixed on the carriage $e$ and their inertia is sufficient to cause them to engage in the perforations of the film or disengage therefrom.

The film is threaded through the apparatus as shown in the drawing and in such a way that the actual length of film comprised between the two feeding rolls is longer by half the height of an image than the shortest way offered to the film from one of the rolls to the other through the guiding frame.

On the other hand, the apparatus is so constructed that the length of film comprised between the roll or drum $a$ and the upper edge of the gate of the apparatus is as short as possible or in other words, the guiding frame is made as short as possible and the roll $a$ is arranged as close to said guiding frame as is consistent with a good working.

When the teeth begin to descend to advance the film, Fig. 1, the latter is stretched between the gate and the lower roller $b$ and said roller acts conjointly with the teeth to start the film, which has the effect of reducing the tractional strain from the teeth on the film and of allowing the speed of travel thereof to be increased. A very high speed can thus be imparted to the film by the teeth, for instance six meters per second, without risking to tear the film. This permits of taking or projecting about 150 views per second.

When the teeth $f$ have reached the bottom of their stroke (Fig. 2), the film has been lowered by the height of an image but the roll $a$ has only paid out a length of film corresponding to half the height of an image so that the film is stretched and held up at that time by the roll $a$ and cannot possibly continue its downward movement by inertia. The film is thus held up without any spring friction shoes being necessary to stop it. During the time the feed carriage $e$ is raised, the view is taken or projected and the teeth assume the position shown in dotted line in Fig. 3, said teeth riding over the perforations in the film.

When the feeding teeth are at the bottom end of their stroke, there exists between the same and the receiving roll $b$ an excess of film length corresponding to half the height of an image and while the teeth are rising to the position shown in Fig. 1, the roll $b$ only acts to wind up said half image length so that while the teeth rise, the roll $b$ has no tendency to displace or advance the film, this being the time of exposure which is about $$\frac{1}{350}$$

of a second. The operation is then continued as above described.

Having now described my invention, what I claim as new and desire to secure by Letters Patent is:

1. A feeding device for cinematograph film comprising in combination a fixed guiding frame, a paying out roll and a receiving roll for the film, means for continuously rotating both rolls, a feeding carriage adapted to move along the guiding frame and having teeth for engaging the film and means for imparting a reciprocating movement to said carriage the film being so placed in the apparatus that it is stretched between the guiding frame and the receiving roll when the feeding teeth are at the beginning of their feeding stroke.

2. A feeding device for cinematograph film comprising in combination a fixed guiding frame, a paying out roll and a receiving roll for the film, means for continuously rotating both rolls, a feeding carriage adapted to move along the guiding frame and having teeth for engaging the film and means for imparting a reciprocating movement to said carriage, the film being so placed in the apparatus that it is stretched between the guiding frame and the paying out roll when the feeding teeth are at the end of their feeding stroke.

3. A feeding device for cinematograph films comprising in combination a fixed guiding frame, a paying out roll and a receiving roll for the film, means for continuously rotating both rolls, a feeding carriage adapted to move along the guiding frame and having teeth for engaging the film and means for imparting a reciprocating movement to said carriage, the film being so placed in the apparatus that it is stretched between the guiding frame and the receiving roll when the feeding teeth are at the beginning of their feeding stroke and stretched between the guiding frame and the paying out roll when the feeding teeth are at the end of their feeding stroke.

4. A feeding device for cinematograph films comprising in combination: a guiding frame; a paying out roll and a receiving roll for the film, means for continuously rotating said rolls whereby the film is imparted a certain average speed, a feeding carriage adapted to move along the guiding frame and having teeth for engaging the film, means for imparting a reciprocating movement to said carriage in which the feeding stroke is effected at a speed which is substantially double the said average speed of the film, the film being so placed in the apparatus that the length of film which actually extends from one of the feed rolls to the other is longer by half the height of an image than the shortest way offered to the film from one feeding roll to the other through the guiding frame.

5. A feeding device for cinematograph films comprising in combination a fixed guiding frame, a paying out roll and a receiving roll for the film, means for continuously rotating both rolls, a feeding carriage, adapted to move along the guiding frame, and having teeth for engaging the film and means for imparting a reciprocating movement to said carriage, the guiding frame having a reduced length and the distance from the paying out roll to the guiding frame being so reduced that the length of film which extends from the paying out roll to the feeding teeth of the carriage when the latter is at the top of its stroke is reduced to a minimum and the film being so placed in the apparatus that said length of film augmented by the length of film which is paid out by the paying out roll during the downward stroke of the feeding carriage is equal to the shortest way offered to the film from the paying out roll to the lowest point of the feeding carriage stroke whereby the film is stretched between the paying out roll and the feeding teeth when the teeth are at the bottom of their stroke.

6. A feeding device for cinematograph films comprising in combination: a guiding frame, a paying out roll and a receiving roll for the film, means for continuously rotating said rolls whereby the film is imparted a certain average speed, a feeding carriage adapted to move along the guiding frame and having teeth for engaging the film, means for imparting a reciprocating movement to said carriage at a speed which is substantially double the said average speed of the film, the guiding frame having a reduced length and the distance from the paying out roll to the guiding frame being so reduced that the length of film which extends from the paying out roll to the feeding teeth of the carriage when the latter is at the top of its stroke is reduced to a minimum, the film being so placed in the apparatus that said length of film is longer by half the height of an image than the shortest way offered to the film between the paying out roll and the feeding teeth.

7. A feeding device for cinematograph films comprising in combination: a guiding frame, a paying out roll and a receiving roll for the film, means for continuously rotating said rolls whereby the film is imparted a certain average speed, a feeding carriage adapted to move along the guiding frame and having teeth for engaging the film, means for imparting a reciprocating movement to said carriage at a speed which is substantially double the said average speed of the film, the guiding frame having a reduced length and the distance from the paying out roll to the guiding frame being so reduced that the length of film which extends from the paying out roll to the feeding teeth of the carriage when the latter is at the top of its stroke is reduced to a minimum, the film being so placed in the apparatus that the length of film which actually extends from one of the feeding rolls to the other is longer by half the height of an image than the shortest way offered to the film from one feeding roll to the other through the guiding frame.

8. A feeding device for cinematographic films, comprising in combination: a fixed guiding frame, a paying out roll and a receiving roll for the film, means for continuously rotating both rolls, a feeding carriage adapted to move in a straight line along the guiding frame, spaced stops on said carriage, loosely mounted feeding teeth pivoted on said carriage and adapted to engage said stops on the carriage for limiting the swinging movement of the teeth in both directions and means for imparting a reciprocating movement to said carriage.

In testimony whereof I have signed my name to this specification in the presence of two subscribing witnesses.

LOUIS JANOT.

Witnesses:
  LOUIS MOSES,
  CHAS. P. PRESSLEY.